P. T. MOODY.
FLYING MACHINE.
APPLICATION FILED MAR. 16, 1911.
996,659.
Patented July 4, 1911.
2 SHEETS—SHEET 1.
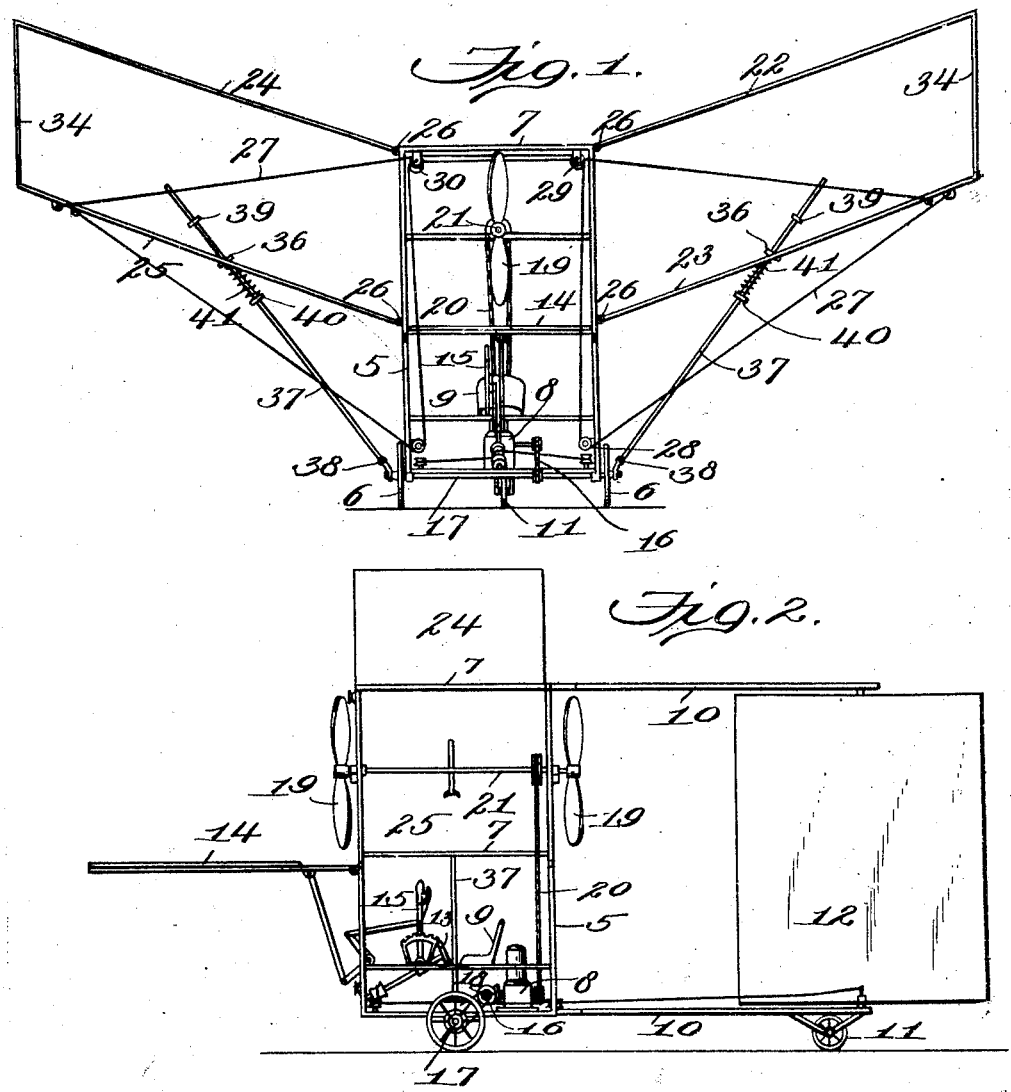
Witnesses:
A. R. Walton
Inventor
Preston T. Moody
by
Attys

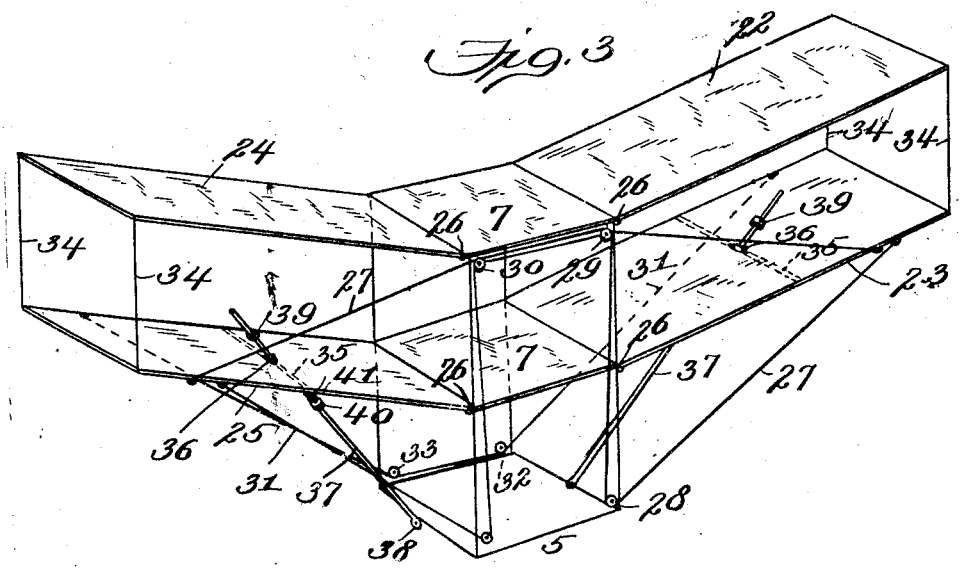
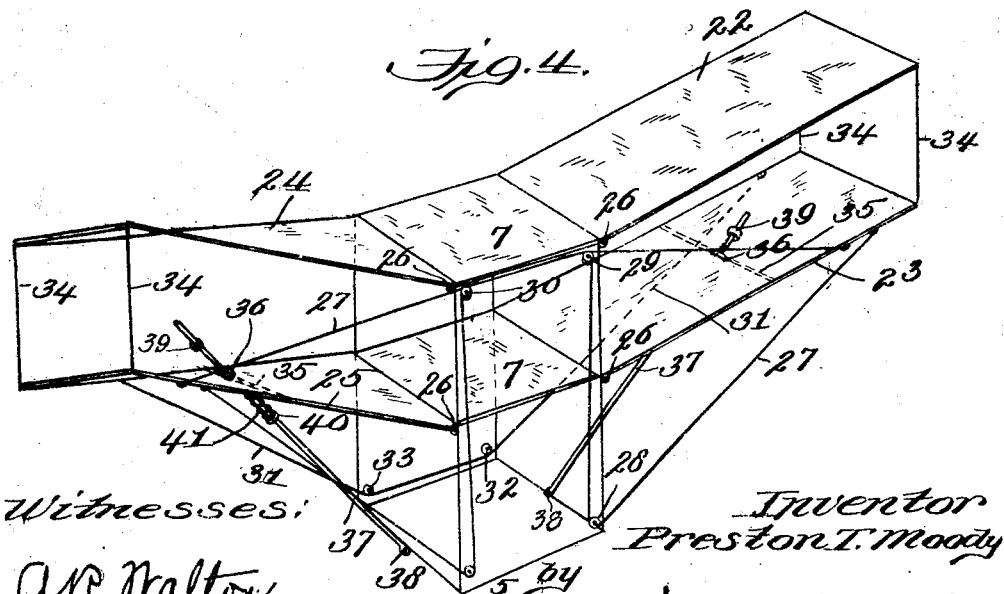

UNITED STATES PATENT OFFICE.

PRESTON TUGMAN MOODY, OF LACROSSE, WASHINGTON.

FLYING-MACHINE.

996,659.     Specification of Letters Patent.     Patented July 4, 1911.

Application filed March 16, 1911. Serial No. 614,809.

*To all whom it may concern:*

Be it known that I, PRESTON T. MOODY, a citizen of the United States, residing at Lacrosse, in the county of Whitman and State of Washington, have invented certain new and useful Improvements in Flying-Machines, of which the following is a specification.

This invention relates to flying machines of the aeroplane type, and it has for its object to provide novel and improved automatically operating means for maintaining the transverse equilibrium of the machine; and to this end the invention consists in a novel arrangement of planes, together with a connection therebetween whereby one of the planes is warped if the other plane is tilted upwardly by the varying conditions of wind pressure, said planes being hinged to the main frame of the machine so that they may swing bodily in a vertical direction.

In order that the invention may be better understood, reference is had to the accompanying drawings forming a part of this specification, in which—

Figure 1 is a front elevation of the machine; Fig. 2 is a side elevation thereof with one of the planes removed, and Figs. 3 and 4 are diagrammatic views showing the planes in different positions and illustrating the warping action.

Referring specifically to the drawings, 5 denotes the main frame of the machine, said frame being mounted on a pair of wheels 6, and carrying superposed planes 7, and below the latter, the motor 8, the driver's seat 9, and the various controlling devices to be hereinafter described.

The main frame has a rear extension 10 which is mounted at its extremity on a wheel 11, and carries a vertical rudder 12 which is operatively connected to a steering wheel 13 carried by the main frame, close to the driver's seat. In front of the main frame is arranged the usual head plane 14 for adjusting the fore and aft inclination of the machine, said plane being operatively connected in a suitable manner to a controlling lever 15 mounted near the driver's seat.

In order that the machine may be started from a state of rest on the ground without employing manual means or a starting incline, power is applied to the wheels 6 from the motor 8, by means of the sprocket-and-chain gearing 16 between the axle 17 of said wheels and the shaft 18 of the motor, said wheels thus serving as traction wheels to propel the machine when on the ground. A suitable clutch mechanism will be provided for disconnecting the traction wheels after the machine leaves the ground.

The means for propelling the machine in the air are screw propellers 19 carried by the main frame, and located, respectively, fore and aft below the upper one of the superposed planes 7. The propellers are driven by the motor 8 through a sprocket-and-chain gearing 20 connecting the motor shaft 18 to the propeller shaft 21, said shaft being common to both propellers. The main frame also carries superposed main sustaining planes, these planes being located on both sides of the machine. The upper and lower planes on one side are indicated at 22 and 23, respectively, and the corresponding planes on the other side at 24 and 25, respectively. These planes are connected at their inner ends to the main frame by a suitable hinge connection 26 so that they may swing bodily in a vertical plane, and they are connected to the main frame at such points as to form continuations of the planes 7.

In order to automatically maintain the transverse equilibrium of the machine, means are provided whereby the upward tilt of one of the planes results in a warping of the other plane, which means will now be described: To the front edge of the plane 23, near its outer end, is made fast one end of a cable 27 from which point the cable extends downwardly to the main frame, and passes over a pulley 28 carried thereby near its bottom, on the same side as the plane 23. From this pulley the cable extends upwardly to a pulley 29 located on the same side of the main frame, near the top thereof, and from the last-mentioned pulley the cable extends across the main frame and passes over a pulley 30 on the opposite side thereof, from which last-mentioned pulley the cable extends downwardly to and is made fast to the front edge of the plane 25, near its outer end. This cable provides a connection between the planes 23 and 25, the purpose of which will presently be made clear. The planes 23 and 25 are also connected by a cable 31 which is connected at its ends to the rear edges thereof, near their outer ends. This cable extends downwardly from the plane 23 to a pulley 32 carried by the main frame at the rear lower portion thereof, on the same side as the plane 23, and from this pulley it extends across the main frame to a pulley 33 on the other side thereof, and thence passes upwardly to the plane 25. The purpose of these connections between the planes is to warp one of the planes if the other plane is tilted upwardly, the connection herein described resulting in a warping of the plane 25 if the plane 23 tilts upwardly. In order that the plane 23 may also be warped in case the plane 25 is tilted, a connection similar to the one 27 herein described, but arranged in an opposite manner, is provided.

The operation is as follows: When a sudden gust of wind strikes the plane 23 it is swung upwardly as shown in Fig. 4, the hinge connection between said plane and the main frame permitting this upward swing. This tends to unbalance the machine, and the side carrying the plane 23 has a tendency to rise, and the side carrying the other plane, to sink. By the upward tilt or swing of the plane 23, the cable 27 is pulled, and as it is attached to the plane 25 at the front edge of the latter, near its outer end, the outer front portion of the plane 25 is elevated. The cable 31 is also pulled and by reason of its connection to the plane 25 at the rear edge thereof, near its outer end, the outer rear portion of the plane is lowered. The plane is therefore warped or given a helical twist, it assuming the position shown in Fig. 4. In this new position of the plane its front or entering edge presents a larger angle of incidence to the resisting air, in view of which the plane will tend to lift or climb up, and thus restore the transverse balance of the machine. If the plane 25 is tilted upwardly, the plane 23 is warped. It will be understood, of course, that the planes have sufficient flexibility to permit the herein described warping action, and the upper and lower planes are connected at their outer ends by rigid rods 34, so that both planes are warped together.

Carried by each lower main plane, at a point between their inner and outer ends, and extending from the front to the rear, is a cross bar 35 having, midway between its ends, an eye 36 through which passes a rod 37 which is pivoted at its lower end, as indicated at 38, to the bottom portion of the main frame 5. The rod also passes through an opening in the lower plane, and has at its upper end, above the cross bar, an abutment 39 to limit the upward swing of said plane. Below the cross bar, the rod has an abutment 40 between which and the cross bar is located a spring 41 which is coiled around the rod. The last-mentioned abutment and spring limit the downward swing of the plane, and prevent the same from swinging down far enough to allow the rod to push through the upper plane. The rod also serves to prevent the plane from dropping down to the ground when the machine alights.

I claim:

1. A flying machine comprising a main frame, planes hinged to the sides thereof to swing bodily and vertically, and means for warping the plane on one side of the machine when the plane on the other side is swung upwardly by the varying conditions of wind pressure.

2. A flying machine comprising a main frame, planes hinged to the sides thereof to swing bodily and vertically, means for warping the plane on one side of the machine when the plane on the other side is swung upwardly by the varying conditions of the wind pressure, and planes carried by the main frame and located between the aforesaid planes.

3. A flying machine comprising a main frame, planes hinged to the sides thereof to swing bodily and vertically, and automatically operating means for warping the plane on one side of the machine when the plane on the other side is swung upwardly by the varying conditions of wind pressure.

4. A flying machine comprising a main frame, planes hinged to the sides thereof to swing bodily and vertically, and connections between said planes to warp one when the other is tilted upwardly by varying conditions of wind pressure.

5. A flying machine comprising a main frame, planes hinged to the sides thereof to swing bodily and vertically, and connections between said planes to automatically warp one when the other is tilted upwardly by varying conditions of wind pressure.

6. A flying machine comprising a main frame, planes hinged to the sides thereof to swing bodily and vertically, connections between said planes to warp one when the other is tilted upwardly by the varying conditions of wind pressure, said connections extending between the front portions of the planes, and also between the rear portions thereof, guides for extending said front connections downwardly from one of the planes and upwardly to the other plane, and guides for extending the rear connections downwardly from both planes.

7. A flying machine comprising a main frame, planes hinged to the sides thereof to swing bodily and vertically, connections between the front portions of the planes, said connections extending downwardly from one of the planes to the main frame, and thence upwardly and across said main frame and downwardly to the other plane, and connections between the rear portions of the planes extending downwardly to the main frame, and thence across said main frame and upwardly to the other plane.

8. A flying machine comprising a main frame, planes hinged to the sides thereof to swing bodily and vertically, means for warping the plane on one side of the machine when the plane on the other side is swung upwardly by the varying conditions of wind pressure, cross bars carried by the planes and having eyes, rods hinged to the main frame and passing through the eyes, abutments on the rods on opposite sides of the cross bars, and springs between the cross bars and the abutments below the same.

In testimony whereof I affix my signature in presence of two witnesses.

PRESTON TUGMAN MOODY.

Witnesses:
E. C. MOODY,
RAY CLARK.